(12) United States Patent
Nikrant et al.

(10) Patent No.: US 10,992,199 B2
(45) Date of Patent: Apr. 27, 2021

(54) HYDROELECTRICAL MACHINE COIL INSULATION METHOD

(71) Applicant: INTEGRATED POWER SERVICES, Greenville, SC (US)

(72) Inventors: Mark D. Nikrant, Pittsburgh, PA (US); Donald Dolence, Pittsburgh, PA (US); Ray Thomas Reid, Greer, SC (US)

(73) Assignee: Integrated Power Services, Greenville, SC (US)

( * ) Notice: Subject to any disclaimer, the term of this patent is extended or adjusted under 35 U.S.C. 154(b) by 694 days.

(21) Appl. No.: 15/221,892

(22) Filed: Jul. 28, 2016

(65) Prior Publication Data
US 2017/0033634 A1 Feb. 2, 2017

Related U.S. Application Data

(60) Provisional application No. 62/199,134, filed on Jul. 30, 2015.

(51) Int. Cl.
| | | |
|---|---|---|
| *H02K 15/00* | (2006.01) | |
| *H02K 3/30* | (2006.01) | |
| *H02K 3/40* | (2006.01) | |
| *H02K 15/10* | (2006.01) | |
| *H02K 15/12* | (2006.01) | |

(52) U.S. Cl.
CPC ............... *H02K 3/30* (2013.01); *H02K 3/40* (2013.01); *H02K 15/105* (2013.01); *H02K 15/12* (2013.01); *Y10T 29/49009* (2015.01)

(58) Field of Classification Search
CPC ..... H01B 13/06; H01B 19/02; Y10T 428/251; Y10T 29/49009; Y10T 442/3935; Y10T 29/49073; H02K 15/12; H02K 15/045; H02K 3/32; H01F 41/122; H01F 27/323; B32B 2307/206; B32B 2315/10
USPC ............................ 29/596, 598, 605, 606, 887
See application file for complete search history.

(56) References Cited

U.S. PATENT DOCUMENTS

| | | | | |
|---|---|---|---|---|
| 4,229,242 A | * | 10/1980 | Otty | ..................... H02K 15/105 156/245 |
| 2013/0221790 A1 | * | 8/2013 | Reid | ........................ H02K 3/40 310/196 |

* cited by examiner

*Primary Examiner* — Thiem D Phan
(74) *Attorney, Agent, or Firm* — Fletcher Yoder, P.C.

(57) ABSTRACT

An insulation system and method are disclosed for insulating formed coils of hydroelectric machines, such as a hydroelectric generator. The system includes strand/turn insulation that may include one or more layers of different materials, depending upon the dielectric requirements. A ground wall insulation is applied over the group of turns. The coil may be sized in a slot cell section. Additional insulation layers are provided, including a slot corona suppression insulation that extends just beyond stator slots, a voltage grading layer, and an armor layer. Time temperature profiles and preheating may be used to cure coil sections via press and heat. The resulting system is suitable for installation in situ, and affords superior resistance to degradation.

5 Claims, 9 Drawing Sheets

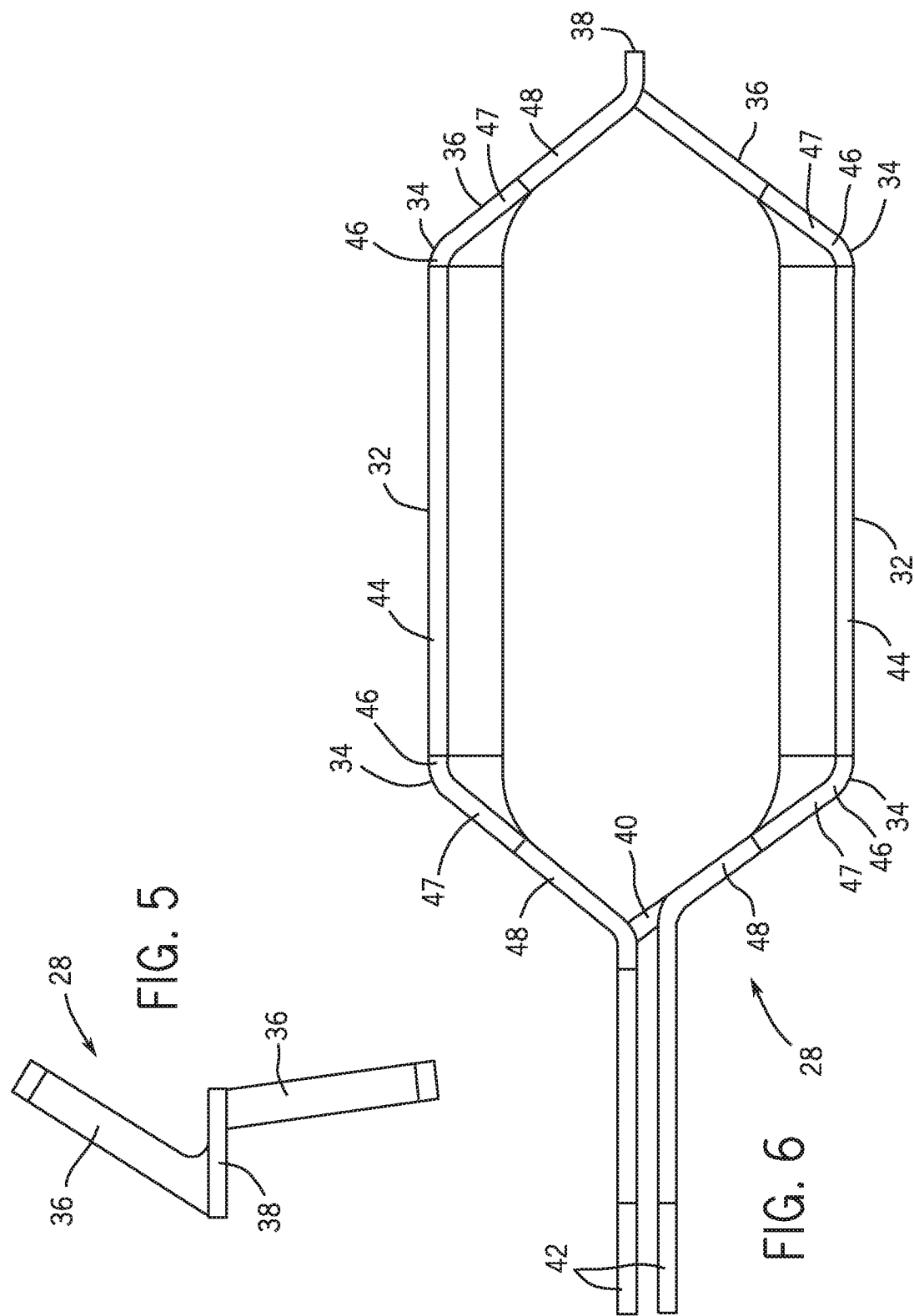

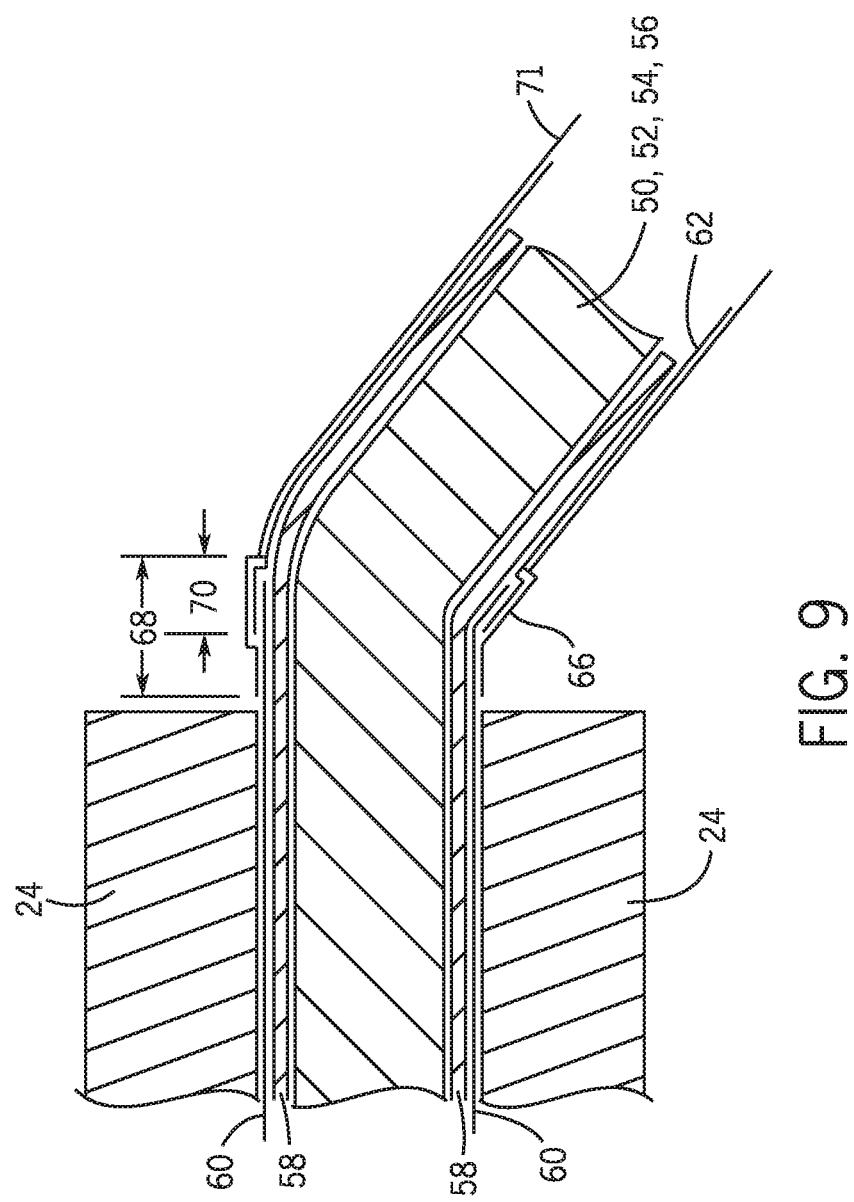

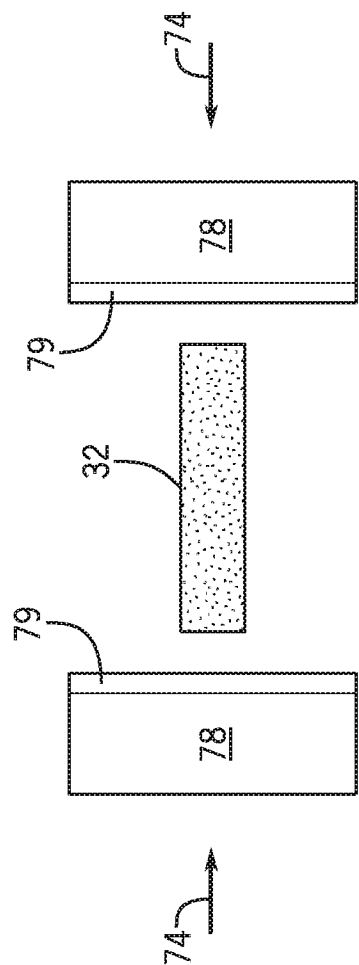
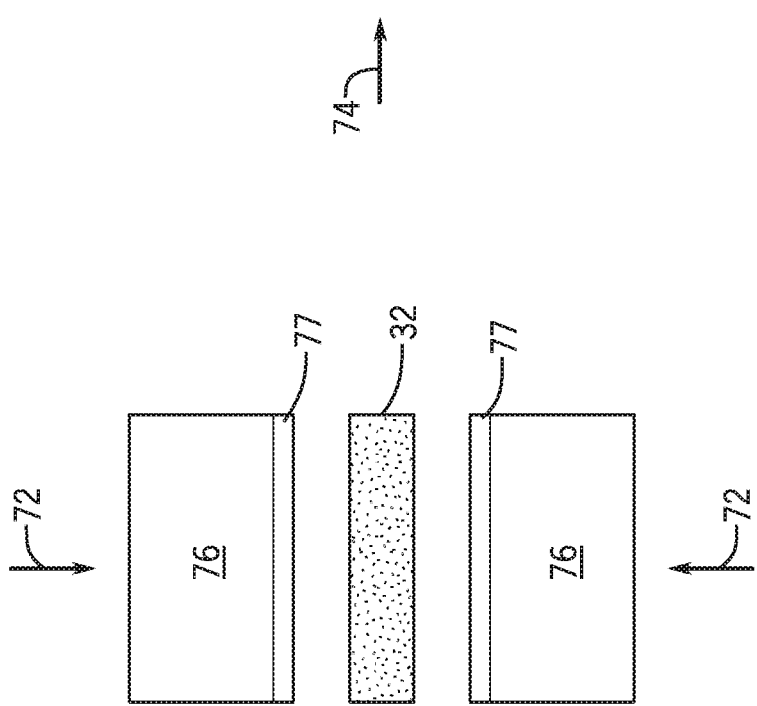

HYDROELECTRICAL MACHINE COIL INSULATION METHOD

CROSS REFERENCE TO RELATED APPLICATIONS

This application is a Nonprovisional Patent Application of U.S. Provisional Patent Application No. 62/199,134, entitled "HYDROELECTRICAL MACHINE COIL INSULATION SYSTEM AND AND METHOD", filed Jul. 30, 2015, which is herein incorporated by reference.

BACKGROUND

The invention relates generally to motor winding and insulation, and in particular to multi-layer, high performance insulation systems for use in hydroelectric applications.

A number of insulation systems and techniques have been developed and are in use for motors, generators, and other rotating electrical machines. In general, such machines include a stator, and a rotor that is disposed in the stator and is caused to rotate under the influence of electric fields generated by the stator (in the case of a motor), or that is driven and itself creates a field that induces current flow in the stator (in the case of a generator). In most such machines, both the stator and the rotor comprise a core and coils or windings of conductive material that carries current in operation. Such coils must generally be insulated from both the core material as well as from one another.

Insulation systems for motors and generators, such as hydroelectric power generators, take various forms, which may be more or less elaborate depending upon such factors as the nature of the machine, the voltage and currents encountered during operation, the voltage differences between neighboring coils, the power rating of the machine, and so forth. In simple systems, varnish or resinous insulation may suffice. However, in higher powered, higher voltage, and larger machines, much more demanding conditions exist either continuously or during periods of operation, requiring more complex, often multi-layer insulation systems.

Coil insulation systems serve several purposes, and these differ somewhat at different locations along the coil and in different environments. For example, because coils are typically forced into slots within the stator and rotor cores, insulation must withstand mechanical treatment during manufacture, and maintain potential differences between the coil and the surrounding slot material. Similarly, multiple coils are often placed in each slot, and these coils experience different potentials during operation. The insulation systems must thus maintain and reduce this difference without breakdown. At coil ends (outside the core), the coils are often in close proximity with one another, and so must also maintain potential differences at these locations.

Such insulation systems are applied both initially, during manufacture of the machines, and may also be applied during reworking or servicing. At both stages, improvements are needed to existing insulating techniques. For example, existing systems still suffer from corona breakdown under certain operating conditions. Moreover, the core materials and coil conductors essentially provide the only parts of the machine that contribute usefully to the power output of motors or of power created in generators. Insomuch as the insulation system occupies valuable space in the machine, reductions in its size, improvements in performance, or both, allow for improved machine performance, increased power rating, reduced derating, and so forth. Because the insulation systems are applied both initially and during the life of the machines, such as hydroelectric generators, such improvements offer advantages in original designs as well as in retrofitting opportunities.

BRIEF DESCRIPTION

The invention provides a multi-layer insulation system for hydroelectric generators, motors and other electrical machinery that can be adapted to particular voltages, current and flux densities, winding configurations and so forth to provide enhanced performance and resistance to corona breakdown. The systems and method of the invention may be utilized in both new machine fabrication as well as in reworking applications that improve performance as compared to original manufacturer insulation system.

DRAWINGS

These and other features, aspects, and advantages of the present invention will become better understood when the following detailed description is read with reference to the accompanying drawings in which like characters represent like parts throughout the drawings, wherein:

FIG. 5 is an end view of a coil of the type shown in FIG. 4;

FIG. 6 is a bottom view of the coil shown in FIGS. 4 and 5, illustrating an exemplary placement of components of the insulation system;

FIG. 9 is a diagrammatical sectional view of an exemplary coil showing components of the insulation system adjacent to an end of a stator core;

FIG. 10A is a side view of a press applying a force and a temperature onto a section of coil;

FIG. 10B is another side view of a press applying a force and a temperature onto a section of coil;

DETAILED DESCRIPTION

Figure 1:
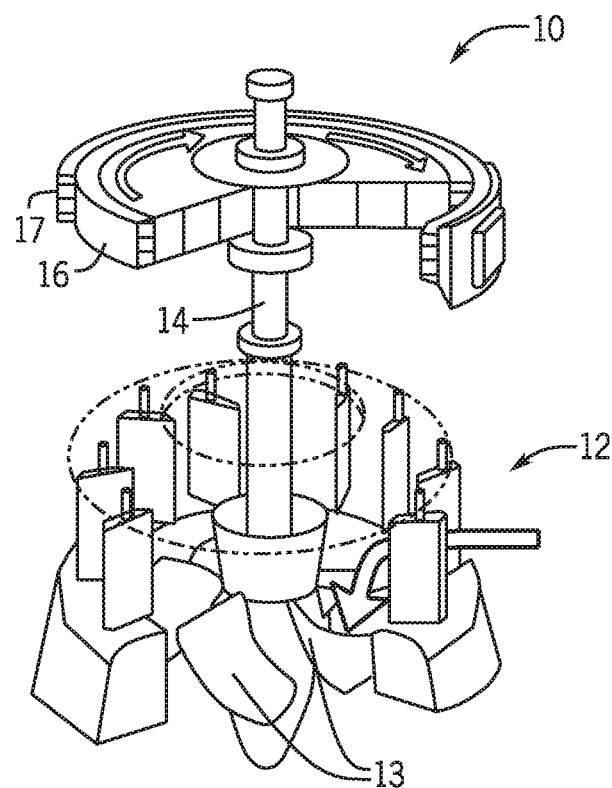
FIG. 1 is a perspective view of an exemplary hydroelectric machine in which the present coil insulating techniques may be applied.

Turning now to the drawings, the insulation system and technique described in the present disclosure may be applied to a variety of electrical machines, and in particular to hydroelectric power generators. An exemplary hydroelectric power generator 10 is illustrated in FIG. 1. The generator 10 generally comprises, in this view, a turbine 12 having turbine blades 13 generally powered via a water flow, from which a rotor shaft 14 extends. As will be appreciated by those skilled in the art, the flow of water may provide rotative power by which the shaft 14 is caused to rotate. The interaction of currents and fields during the rotation of a rotor 16 with respect to a stator 17 will then result in the generation of usable electric power. The generator 10 may then be electrically coupled to a grid, such as a power grid suitable for delivering electric power to a variety of residential and commercial entities. Many different styles, types, sizes, voltage ratings, and so forth may be accommodated by the present insulation techniques. However, the techniques are particularly well-suited to large generators, such as on the order of approximately 6,600 to 16,000 volts. Power ranges for the insulation system may vary, for example, between 1000 kW and 40,000 kW. In general, these machines will be multi-phase, such as three-phase.

Figure 2:
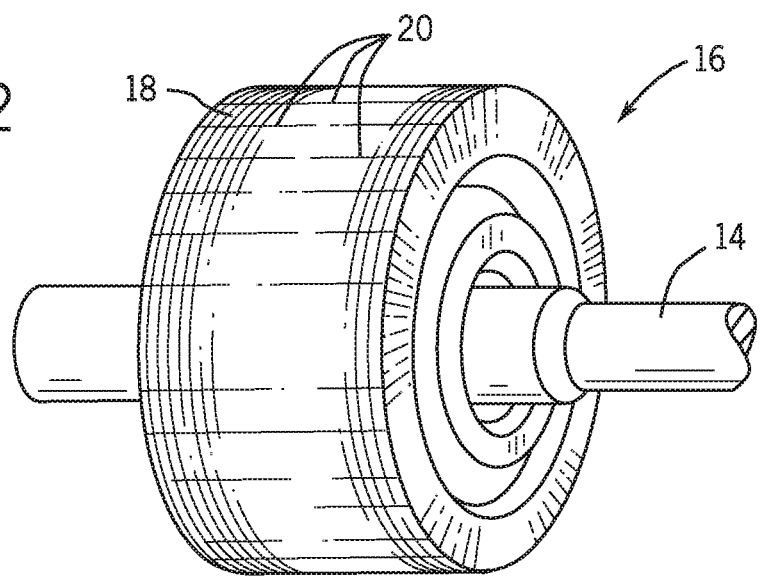
FIG. 2 is a perspective view of an exemplary rotor of such a machine.

FIG. 2 illustrates the exemplary rotor 16 from a hydroelectric generator 10 of the type shown in FIG. 1. The shaft 14 extends from the rotor 16 and mechanical components link the shaft 14 to a rotor core 18. The rotor core 18 will have a series of slots 20 in which rotor windings are disposed. The windings may be interconnected based upon the particular generator 10 design, the speed of the water flow providing for motive power, ratings of the generator 10, the number of poles in the generator 10, and so forth.

Figure 3:
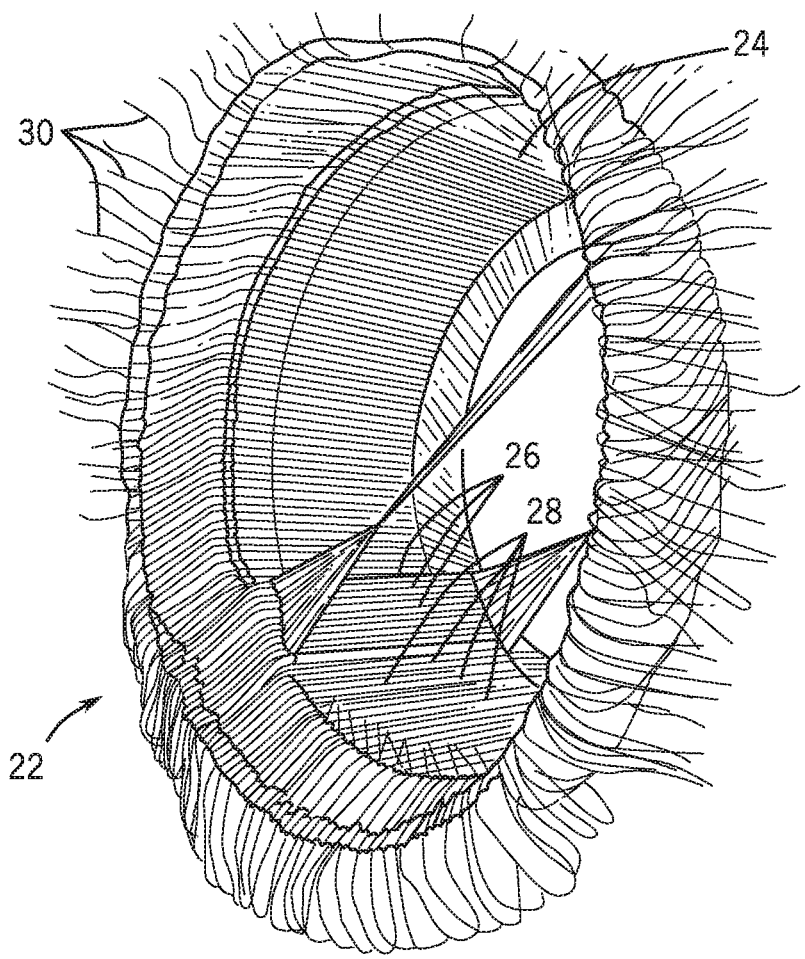
FIG. 3 is a perspective view of a portion of a stator in which coils insulated in accordance with the present disclosure are being installed.

FIG. 3 illustrates an exemplary stator 17 for a generator of the type shown in FIG. 1. The stator 17 is mounted and statically held within the housing of the machine, and the rotor is later placed within the assembled stator, supported by bearings, such that it may rotate within the stator. A large central opening is therefore provided in the stator core 24. Around the inner periphery of the stator core 24 are a series of slots 26. The length, number, and position of the slots may vary depending upon the number of poles in the machine, the power rating of the machine, the number of phases, and so forth. In particular, windings or coils 28 are disposed in the slots, and in many cases multiple coils (e.g., two) may be disposed in each slot. Various slot geometries, winding patterns and combination of windings within the slots may be employed, again depending upon the motor design. In general, the coils may have leads that extend through a single end of the motor stator core, or leads may extend from both sides. The leads 30 are ultimately laced and interconnected to form groups and phases of the stator. The interconnections may thus allow for multi-phase operation, while providing a desired number of poles and a suitable winding configuration (e.g., wye or delta).

The present disclosure is directed in particular toward formed coils. That is, the coils disposed in the stator slots are formed and insulated prior to installation in the slots, with certain operations being performed before installation (e.g., hot forming or pressing using certain specific temperature profiles). Such formed coils are generally essentially complete prior to installation into the stator slots, and form what can be large, generally rigid structures containing the electrical conductors that will carry current and generate electrical fields or be influenced by electrical fields during operation. As will be appreciated by those skilled in the art, significant potential differences may be developed between the coils in the stator slots, between the coils and the stator core material, between adjacent coils at ends of the stator, and so forth. The present insulation system and techniques allow for maintaining such potential differences while avoiding breakdown of the insulation system that can cause premature failure or degrade a performance characteristic of a machine.

Figure 4:
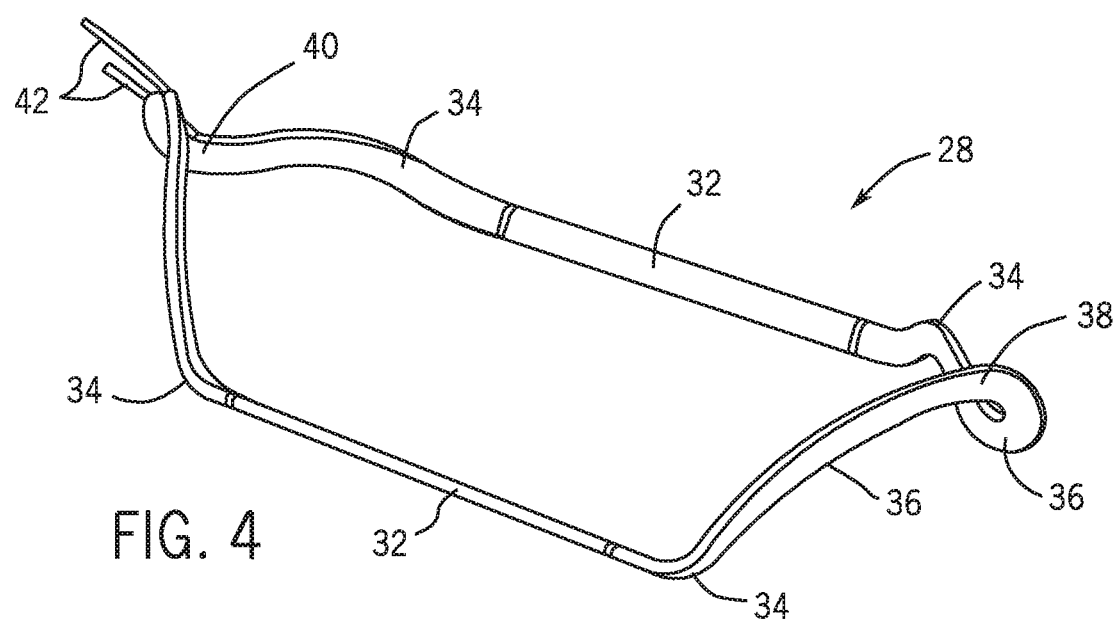
FIG. 4 is a perspective view of an exemplary formed coil on which the insulation system may be applied.

FIG. 4 illustrates an example formed coil insulated in accordance with the present disclosure. It is to be understood that other coil examples with different geometries may be insulated using the techniques described herein. Indeed, any number of geometries, including any number of curves, angles, straight runs, and so on, may be used. The coil 28 generally includes two slot cell sections 32 opposite one another that are configured and insulated to fit within slots of the stator core. On ends of the slot cell sections, bends 34 are formed. The coil illustrated in FIG. 4 has end arms 36 joined by an end winding 38 to form a loop that is completed by a knuckle 40 around which conductors extend prior to being terminated at leads 42. Electrically, then, the coil comprises a circuit that begins at one lead, winds around multiple turns comprised in the various sections of the coil, and that terminates again in the opposite lead. As described in more detail below, the various sections of the coil are insulated in specific ways to provide optimal performance and resistance to degradation, particularly corona breakdown.

An end view of the coil is illustrated in FIG. 5, while a bottom view is illustrated in FIG. 6 in which the multiple different types of insulation layers are called out. As can be seen in FIG. 5, the end winding 38 extends between the end arms 36 and completes the loop of the conductors within the coil winding. As shown in FIG. 6, this structure places both leads 42 at one end in a loop arrangement comprising the slot cell sections 32, the bends 34, and end arms 36, the end winding 38, and the knuckle 40. Insulation is applied to these various sections both prior to, during, and following forming of the sections. That is, certain portions of the insulation are applied, followed by forming, then by application of additional insulation as described below.

As shown in FIG. 6, the insulation system, from a coil geometry standpoint, may be considered to have several regions. First, in a slot cell section insulation system 44 is disposed over the slot cell sections 32. This insulation system is designed to isolate individual strands (where desired) from one another, individual turns from one another, and the slot cell sections from other slot cavity sections in slots of the machine core, as well as from the machine core material itself. The slot cell section insulation system comprises multiple layers as described more fully below. A voltage suppression layer 46 extends across and beyond the slot cell section insulation system and allows for reduction of surface voltage stress where the coil contacts the stator core. A semiconductive voltage gradient tape 47 is employed on the coil extension 48. The gradient tape layer overlaps the corona suppression tape and extends toward the coil end turn and knuckle on both ends of the coil. The gradient tape layer allows for safe reduction of the voltage stresses that exist at the termination of the corona suppression tape. An armor tape layer 48 extends beyond the voltage grading layer and covers the coil end arm extensions including the end turn and knuckle sections.

Figure 7:
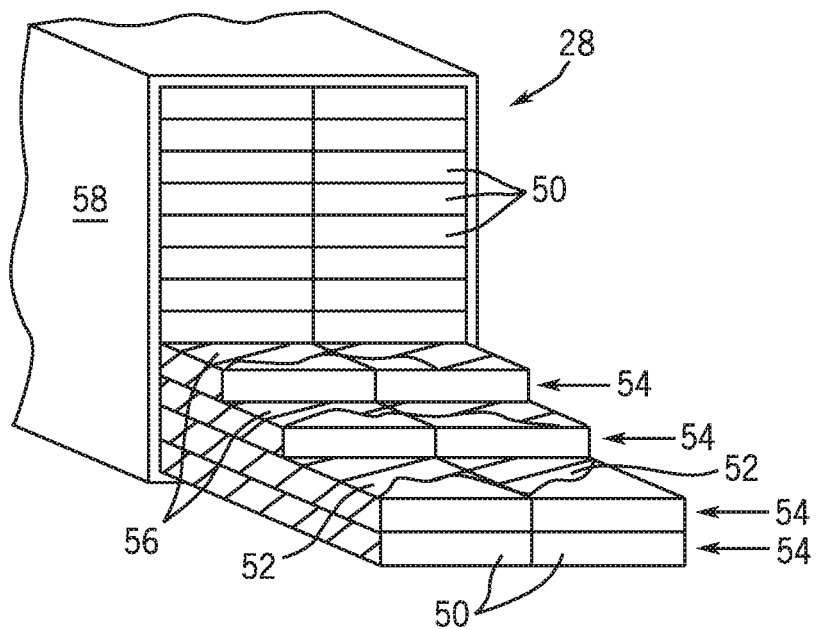
FIG. 7 is a perspective view of an exemplary coil comprising a number of turns of a conductor and elements of the insulation system.
Figure 8:
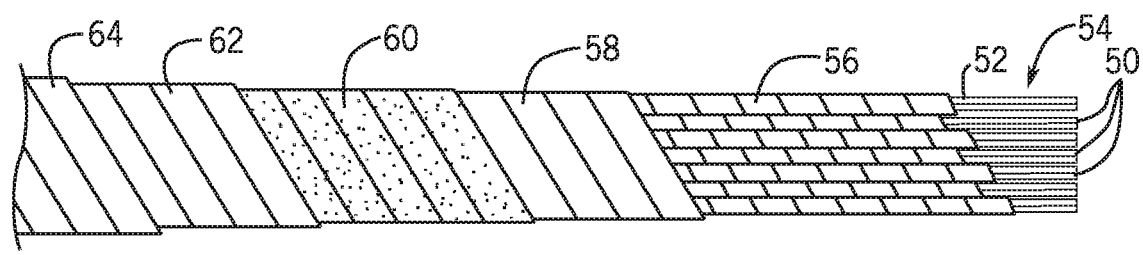
FIG. 8 is a diagrammatical side view of an exemplary coil with components of the insulation system.

FIGS. 7, 8 and 9 illustrate the various layers of insulation in somewhat greater detail. As best shown in FIG. 7, each coil may comprise a number of individual conductors 50. These conductors are typically rectangular in cross-section and may be stacked vertically, horizontally or both. The conductors are generally made of copper, although various alloys and other materials may be employed. Where desired, the individual conductors may comprise a first level of insulation that is referred to herein as strand insulation 52. In present embodiments this strand insulation 52 may comprise one or more layers of material that is wrapped around the individual conductor in an overlapped arrangement. At least some of the strand insulation 52 may typically be in a tape form, as are other portions of the insulation system described herein. One or more strands may then form a turn 54. In the illustrated embodiment, side-by-side strands form each turn 54. Each turn may then be insulated from other turns by turn insulation (e.g., mica-containing turn tape). With the insulated turns stacked in the formed coil, the insulation system then includes a ground wall insulation 58 that surrounds all turns of the coil. The ground wall insulation, the turn insulation and the strand insulation (where used) will generally extend over the entire length of the coil, including the slot cell sections, the bends, the end arms, the end turn, and the knuckle.

FIG. 8 illustrates successive layers of insulation as may be provided on an exemplary coil. As noted above, the coil essentially contains conductors 50 over which strand insulation 52 may be applied. The turn insulation 56, then, is provided over each successive turn. The ground wall insulation 58 is provided over all of the turns and thereby over all of the turn insulation. A slot corona suppression layer 60 is then provided at certain locations over the ground wall insulation. A further layer of insulation, referred to herein as a voltage grading layer 62 may be provided beyond the slot corona suppression layer 60. Finally, an armor insulation 64 is provided at certain locations around the coil as described below. In one embodiment, each of the layers 52, 54, 56, 58, 60, 62, and/or 64 may include 33% solventless epoxy resin rich tape. That is, tapes used for the layers 52, 54, 56, 58, 60, 62, and/or 64 may be impregnated with an epoxy resin at certain percentage by weight, percentage by volume, and so on, such as percentages between 15%-45% with an exemplary percentage of approximately 33%. The resin is in liquid or "gel" form, as opposed to a dry form resin having a binder. In some embodiments, certain layers (e.g., armor insulation 64) may not include the resin. In yet other embodiments, a combination of one or more of the layers 52, 54, 56, 58, 60, 62, 64 may include the resin.

Referring back to FIG. 6, and keeping in mind the various insulation layers mentioned with reference to FIGS. 7 and 8, the slot cell sections 32 will typically include strand/turn insulation as well as ground wall insulation. The slot corona suppression layer 60 is provided over the ground wall insulation in the areas where the coil will be placed in the stator slots (i.e., over the slot cell sections). The slot corona suppression insulation extends beyond portions of the coil that will be placed in the slots, that is, beyond the outer extremities of the stator core. In presently contemplated embodiments, this slot corona suppression insulation extends beyond the ends of the stator core a minimum of 1 inch, although other extensions may be utilized. In general, this insulation may extend to the first bend of the coil beyond the slot cell sections. The slot corona suppression insulation is placed over the ground wall insulation, and may comprise a conductive tape as described below.

The voltage grading layer 62 is overlapped with the slot coronal suppression insulation, and is typically made of a stress grading tape. Referring to FIG. 9, the slot corona suppression insulation 60 is illustrated extending beyond the stator core slot, with the voltage grading layer overlapping in a region 66. In a presently contemplated embodiment, for example, the distance 68 is again approximately 1 inch. The insulations may overlap by a distance 70, such as approximately ¾ inches. Here again, from this point the voltage grading layer may extend approximately 6 inches or so onto the end arm or near the area where the coil is bent.

Referring back to FIGS. 6 and 8, the armor insulation layer 71 comprises a tape that is wound over ends of the coil, and may be wound at least partially over the gradient tape and over the ground wall insulation outside of the slot cell cavity sections. The resulting insulation system is highly adaptable to various coil configurations, voltage ratings, dielectric requirements, and a host of other electrical machine specifications. The following tabulated summary outlines certain presently contemplated combinations of these layers along with their performance and selection criteria:

Strand/Turn Insulation Components
 one component—film

| typical | build (inches) | dielectric strength (V/mil) |
|---|---|---|
| heavy | 0.003-0.004 | 750-950 |
| quad | 0.005-0.006 | 750-900 | two component—glass/film

| typical | build (inches) | dielectric strength (V/mil) |
|---|---|---|
| SDG/HF | 0.010-0.011 | 470-520 |
| SDG/QF | 0.011-0.012 | 550-600 |
| DDG/HF | 0.014-0.015 | 490-520 |
| DDG/QF | 0.015-0.016 | 550-580 | additional component—mica/film

| typical | build (inches) | dielectric strength (V/mil) |
|---|---|---|
| mica/film | 0.016-0.020 | 650-810 | additional component—micafold

| typical | build (inches) | dielectric strength (V/mil) |
|---|---|---|
| micafold | 0.013 | 1014 | additional turn insulation—turn tape/film

| typical | build (inches) | dielectric strength (V/mil) |
|---|---|---|
| tape/1HL film | 0.024-0.028 | 640-695 |
| tape/2HL film | 0.048-0.056 | 570-660 |

Where "heavy" indicates thick build enamel, "quad" indicates thick build plus an additional coat of enamel, "SDG" indicates "single glass layer" (e.g., one wrap), "DDG" indicates "double glass layer" (e.g., two wraps), "HF" indicates heavy film, "QF" indicates quad film, "1HL" indicates a single layer of tape with ½ overlap between successive wraps, "2HL" indicates two layers of tape with ½ overlap between successive wraps, and "micafold" indicates mica tape used for high turn to turn voltage stress applications.

Strand/Turn Insulation Selection

| strand/turn insulation | volts per turn (max) |
|---|---|
| film | 30 |
| SDG/film | 40 |
| DDG/film | 60 |
| mica/film (2BL) | 120 |

-continued

| strand/turn insulation | volts per turn (max) |
|---|---|
| micafold | 160 |
| turn tape/film (1HL) | 180 |
| turn tape/film (2HL) | =>180 |

Ground Wall Insulation

| Typical epoxy resin rich tapes | three ply | | two ply | |
|---|---|---|---|---|
| total thickness (inches) | 0.009-0.0095 | | 0.0055 | |
| mica content (gm/m$^2$) | 160 | | 160 | |
| Volt. Class (kv) | 6.9 | 11 | 12.47 | 13.8 |
| typ. HL layers | 5 | 7 | 8 | =>8 |
| coil mfg surge test (kv) | 15 | 24 | 27 | 30 |
| coil mfg DC test (kv) | 16 | 24 | 28 | 28 |
| final test AC (kv) | 14.8 | 23 | 25.94 | 28.6 |
| final test DC (kv) | 25.16 | 39.1 | 44.098 | 48.620 |

As noted above, the insulation system is particularly well suited to high voltage applications, such as between 6.6 kV and 16 kV, although the system can also be used in other voltage classes, such as medium voltage machines.

Regarding individual insulation types and layers, the strand insulation, when utilized, will typically provide isolation of the individual strands, and may be used based upon turn-to-turn dielectric requirements. In certain presently contemplated embodiments summarized above, the strand/turn insulation may comprise a resin applied over the individual turns and/or strands, such as an underlying coating based on a polyester (amide imide) resin and a superimposed coating based on polyamideimide resins. Moreover, single glass layers may be utilized, where a combination of a single layer of polyester-glass and film are used for the strand/turn insulation. Where used, the glass is an electrical grade filament glass yarn and a polyester utilized is a high grade yarn made from a glycol-acid polymerization. Still further, double layers of polyester glass and film may be used for the strand/turn insulation. In such cases, the glass and polyester are similar to those in the single layer case. In addition, a combination of a mica-contained tape and film may be utilized. In a presently contemplated embodiment, the mica tape comprises a muscovite mica paper impregnated with an electrical grade modified epoxy resin, both sides being covered with a polyethylene terephthalate (PETP) film. Moreover, a micafold layer may be utilized, such as a combination of Nomex (a flame resistant meta-aramid available from E.I. Du Pont De Nemours & Co.) and heavy film. The Nomex may be applied longitudinally and bonded to the film via an epoxy-nylon. Finally, one or more overlapped tapes may be utilized, such as a glass-backed high-porosity mica tape applied over the turned bundle. The mica tape, when utilized, is typically the same material used for the ground wall insulation discussed below, and the strands may be insulated with film, glass or a combination thereof.

As noted above, the various layers of the strand/turn insulation may be selected based upon the desired dielectric strength, as indicated in the tabulated summary above. Moreover, the number and types of successive layers may be selected based upon the anticipated volts per turn potential difference. In general, a film is used, or a combination of glass and film may be used successively. If further potential differences are to be encountered, the mica/film layer, micafold, and tape/film layers may be added.

In presently contemplated embodiments, the ground wall insulation is then applied over the strand/turn insulation. The ground wall insulation is typically applied with two opposing tape rolls (e.g. 33% resin rich tape) using a ½ width overlap between successive wraps with a ¼ lap index. To optimize the insulation system the tape tension may be controlled at approximately 16-18 ft-lbs, for a one inch wide tape, by an automatic taping machine, or may be done by hand. The final size is then checked with a slot fit gage to ensure that the insulated coil will fit within the stator slots. As also summarized in the tabulated summary above, the mica content of the ground wall insulation is preferably high, on the order of 160 gm/m$^2$. The number of ½ wrapped layers may be selected based upon the operating voltage and rating of the machine, as noted above.

The slot corona suppression insulation is also applied as a tape (e.g., 33% resin rich tape), and may be referred to as a shielding tape. In presently contemplated embodiments, the slot corona suppression insulation may be considered as a ground wall partial discharge suppression layer that bleeds the high voltage stress away from the coil that would otherwise result in corona and partial discharge. This tape is applied over the ground wall tape. Partial discharges created by high-voltage stress that occurs in the ground wall of the coil rated above approximately 4-5 kV may be suppressed to prevent partial discharge between the surface of the coils and the stator core. In presently contemplated embodiments, the slot corona suppression tape is applied in one ½ overlap layer. The shielding tape may consist of a polyester fleece impregnated with a graphite-loaded resin, for example. A conductive laminate may be used in the slots for a bottom stick, center filler and top slider under the slot wedge (not shown) where desired. Moreover, the slot corona suppression tape usually extends through the center of each bend or through the straight portion of the coil, as discussed above. The tape application tension for the slot corona suppression tape, when applied, is held to a lower level than that used for the ground wall to prevent wrinkling or buckling of the ground wall tape.

Further, the voltage grading layer may also be referred to as a stress grading tape or gradient tape. This is typically applied in one layer with ½ width overlap between wraps. The length of this insulation depends on the test voltage, and commonly extends between 4 and 6 inches along the coil at each end. The voltage grading layer serves to reduce the surface stress at the end of the slot corona suppression tape outside the stator core. Here again, it is typically applied with a ¾ to 1 inch overlap over the end of the slot corona suppression tape. In a present embodiment, the voltage grading layer is made of a polyester fleece impregnated with a silicon carbide-loaded resin compatible with the epoxy resin (e.g., 33% resin rich tape) employed in the ground wall insulation.

As shown in FIGS. 10A and 10B, press forces 72 and press forces 74 may be applied to certain sections of each of the formed coils (e.g., slot cell sections 32). More specifically, FIG. 10A depicts a side view of a press 76 applying the force 72 in a top-to-bottom orientation, while FIG. 10B depicts a side view of a press 78 applying the force 74 in a side-to-side orientation. In some embodiments, the press 76 and 78 are the same press and the coil section (e.g., slot cell sections 32) may be rotated to apply the desired forces 72, 74. The pressing may include the application of heat via heating plates 77, 79 disposed on the presses 76, 78, and in one exemplary embodiment, the application of specific time temperature profiles, as described in more detail below. By using the techniques described herein, stators 17 of large electrical machines, such as the hydroelectric generator 10, may be more accurately rewound without having to place the entire stator 17, which may be quite large (e.g., over 14 ft. diameter or more), into a curing oven. For example, the pressing and heating process that delivers the forces 72, 74, may result in a more accurate cured geometry for the slot cell sections 32 such that the sections 32 may more precisely fit inside of stator 17 slot cells. While the embodiment shown in FIGS. 10A and 10B shows the geometry for the slot cell sections 32 as substantially rectangular, any number of geometries may be pressed, heated, and cured, including square geometries, trapezoidal geometries, triangular geometries, geometries having curves (e.g., circular geometries, oval geometries), or a combination thereof.

While the remainder sections of the coil or coils 28 may be similarly pressed, heated, and cured, for example by presses 76, 78 that form specific geometries; in an exemplary embodiment, the remaining sections of the coils 28 (e.g., sections of the coil 28 other than sections 32) may not be pressed. In one example, the remaining sections may be cured by having heat applied through heat guns and/or an oven. The tapes (e.g., 33% resin rich tapes) in the various layers 52, 54, 56, 58, 60, 62, and/or 64 may cure based on a temperature gelling curve. Accordingly, if using heat guns, the heat guns may raise the temperature of the layers 52, 54, 56, 58, 60, 62, and/or 64 to "kick off" the curing process. For example, the temperature may be raised to above between 100° F.-200° F. When certain geometric accuracy is more suitable, any one of the sections of the coil 28, e.g., sections 34, 36, 38, 40, 42 may be placed in a metal form having the desired geometry, and then the metal form with the corresponding sections may be heated in an oven for a desired curing time period. For example, oven heat may be applied at between 210° F.-350° F. for between 2 and 16 hours, with approximately 325° F. as an exemplary temperature. Sections 32, 34, 36, 38, 40, and/or 42 may then be reassembled as a fully cured coil 28 and placed in the stator 17.

Figure 11:
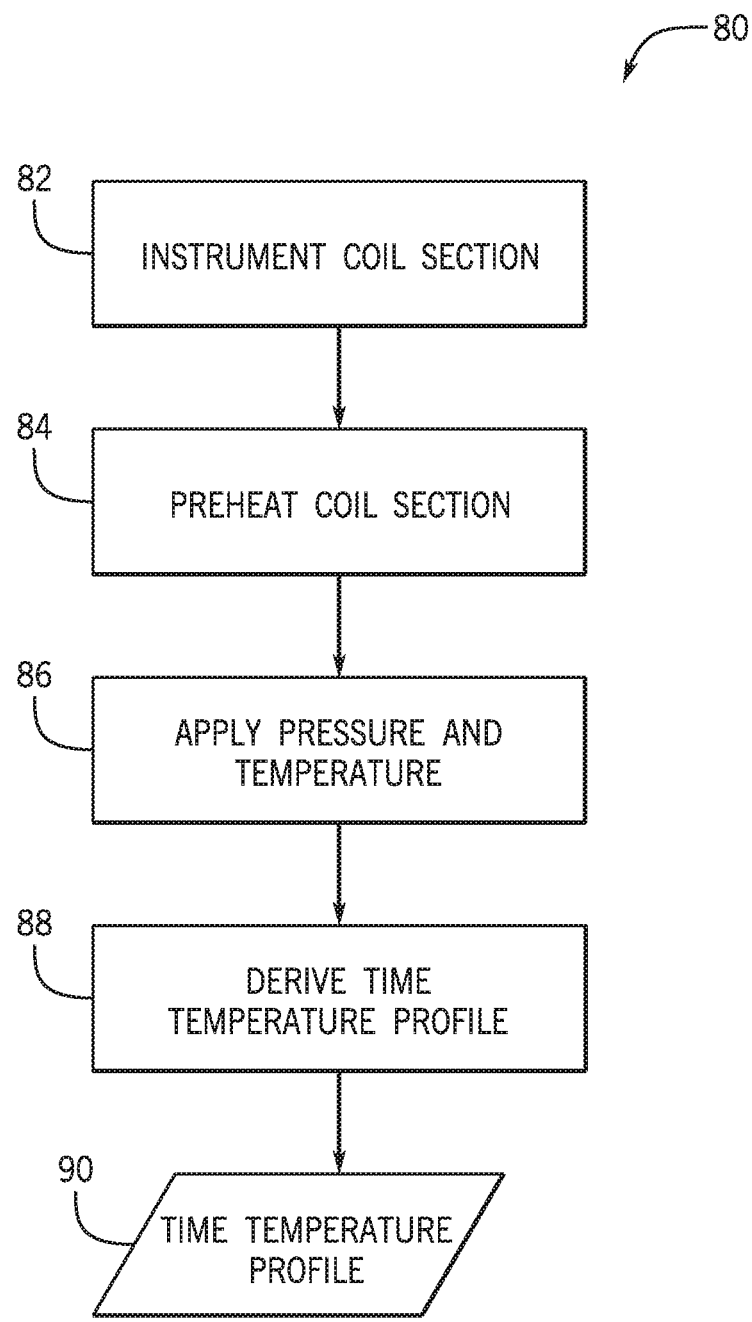
FIG. 11 is a flow chart illustrating a process suitable for deriving a time temperature profile.

As mentioned earlier, the pressing operation may, in an exemplary embodiment, use certain time temperature profiles. As illustrated in FIG. 11, a process 80 may be used to derive one or more time temperature profiles suitable for curing certain sections of the coil 28 (e.g., sections 32) via pressing and heating techniques. The process 80 may be implemented as computer code or instructions stored in a memory of a computing machine and executable via a hardware processor. The process 80 may first instrument (block 82) one or more coil 28 sections, such as sections 32. For example, temperature sensors (e.g., thermocouples) may be place on the metal conductor 50, in between the various tape layers of the coil 28, and so on, to instrument desired coil sections. The process 80 may then preheat (block 84) the instrumented coil section, for example, applying a heat of between 50° C.-120° C., with an exemplary value of 80° C. The preheating (block 82) of the instrumented coil may enable the conductor 50, which typically acts as a heat sink, to be at a temperature hot enough such that subsequent application of heat external to the instrumented coil section (e.g., via heating plates 77, 79 on the presses 76, 78) does not transfer the external heat substantially away from the coil 28 section being heated. Indeed, it has been found that the preheating step (block 84) maintains temperature differences between the conductor 50 and the various tape layers 52, 54, 56, 58, 60, 62, and/or 64 at less than between 2° C.-15° C.

The process 80 may then apply a first heat and first pressure (block 86). The first heat may be between 210° F.-350° F. with an exemplary temperature of around 325° F., and the first pressure may be between 300 PSI-1000 PSI with an exemplary pressure of 500 PSI. Sensors readings, such as temperature readings, may then be taken to determine a point of maximum lubricity at which the tape layers may all "move" together when pressed. For example, after certain time, all of the layers, including inner layers 58 and/or 56 may reach a desired temperature representative of their approximate maximum lubricity, such as a temperature between 120° C.-150° C. Accordingly, the derivation (block 88) of a time temperature profile 90 having an approximate maximum lubricity may be provided by the process 80. During actual insulation operations, the time temperature profile 90 may be followed to a point of maximum lubricity or to a lubricity window, at which time a second, higher pressure may be used to complete the pressing and curing of the coil section.

Figure 12:
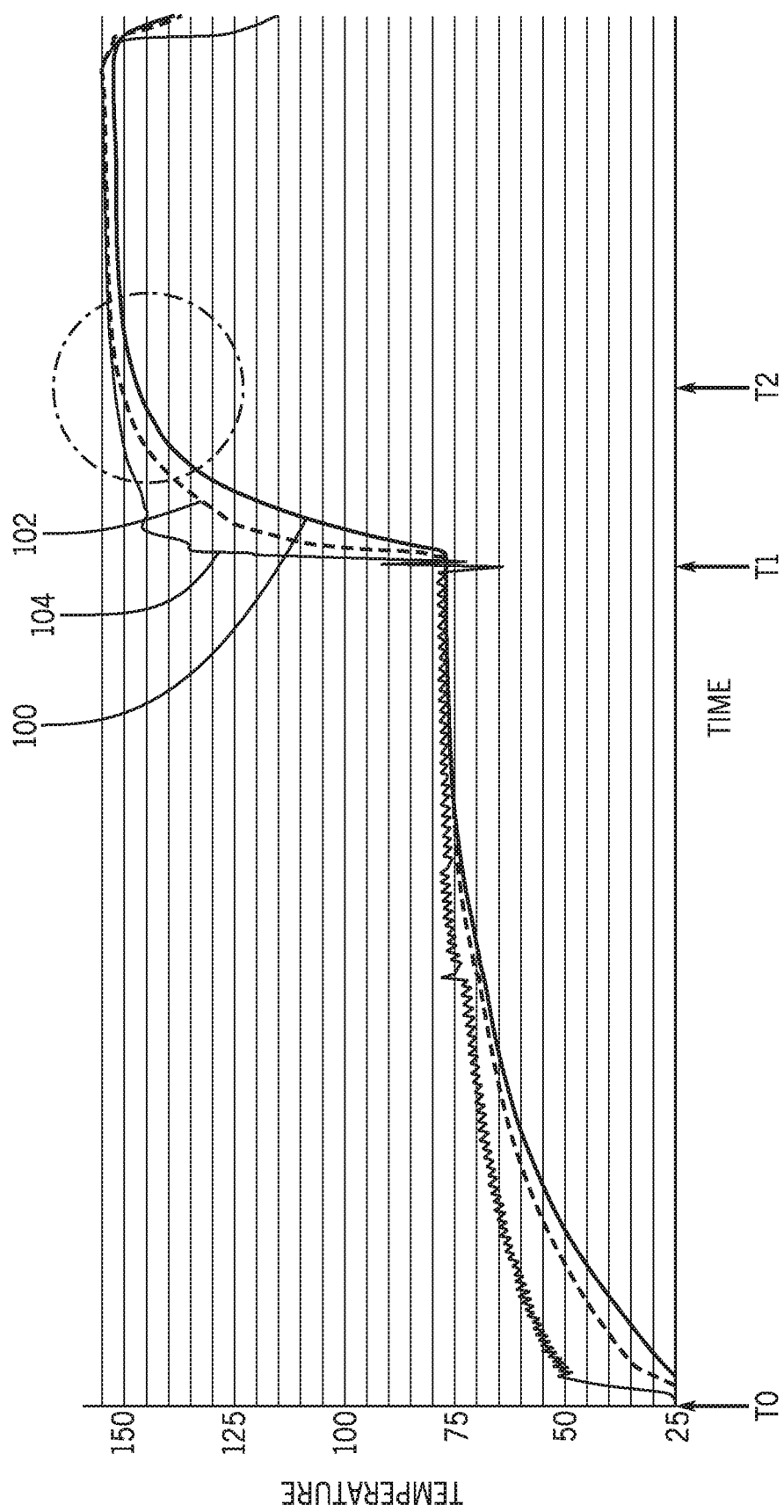
FIG. 12 is an example of a time temperature profile.

For illustration purposes only, an example, time temperature profile 90 is depicted in FIG. 12. As depicted, three curves 100, 102, and 104 are representative of temperatures adjacent to conductors 50, near a middle of the layer 52, 54, 56, 58, 60, 62 stack, and on an outside layer (e.g., outside of layer 62 and/or 64), respectively, of an instrumented section of coil 28. As illustrated, the section (e.g., section 32) of coil 28 is first preheated from time T0 to time T1. At time T1, the first heat and first pressure is applied, and a point of maximum lubricity (e.g., time T2) may be derived based on a time at which temperatures of the curves 100, 102, 104 may reach a region 106 representative of a point where the tape layers (e.g., 52, 54, 56, 58, 60, 62, and/or 64) may all fluidly move approximately equally. In time region 106 (e.g., time T2), a "bump" cycle may apply a second pressure, such as a pressure between 1000-3000 PSI, with an exemplary value of 1500 PSI, which will them compress and cure the various tape layers such that minimal or no tape "bunching," wrinkling, and other undesired tape conditions are found in the resulting section of the coil 28. The region 106 is also known as a lubricity window. In one embodiment, the temperature applied via the plates 77, 79 may stay the same during the "bump" cycle. In other embodiments, the temperature may be raised or lowered during the "bump" cycle.

Figure 13:
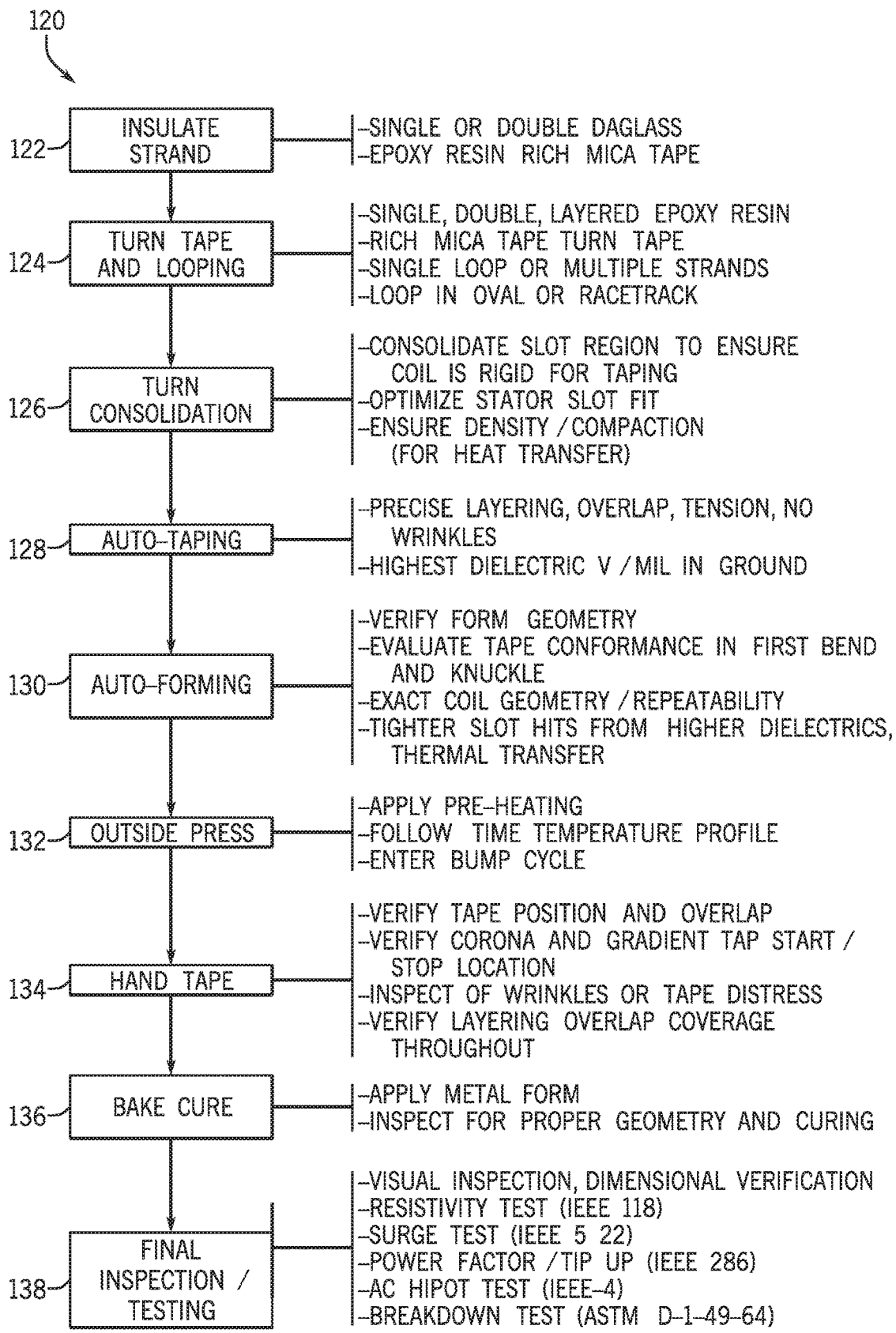
FIG. 13 is a flow chart illustrating a process suitable for creating, insulating and testing the insulation system, along with features and advantages of the steps or phases of the process.

Turning now to FIG. 13 and as previously noted the insulation system may be applied at various stages, both by hand and utilizing automatic taping machines. FIG. 13 illustrates exemplary steps in forming and insulating the coils, along with certain details regarding the process, and advantages of each step. The process, designated generally by reference numeral 120, begins with applying any desired strand insulation as indicated at step 122. As noted above, such strand insulation may comprise resin rich tapes, and so forth, with the tape being overlapped when required. The strand insulation, again, depends upon the dielectric rating desired for the strands. Subsequently, turn tapes may be applied as indicated at step 124. As noted above, these may comprise single, double and layered resin rich turn tapes, which may be applied in single conductor or multiple strand loops. In general, the turn tapes will surround each turn of the coil as it is formed.

At step 126, a forming process is performed that comprises turn consolidation. In general, this a sizing process that consolidates the turns in the slot cell regions to ensure the coil is rigid for taping and optimally sized to fit within the stator slot. The turn consolidation also ensures the desired density and compaction, such as for thermal transfer.

Once consolidated, automatic taping may be performed as indicated at step 128. This automatic taping allows for precise layering, overlapping and tension of the ground wall insulation with no wrinkles or pockets between the turn insulation and within the ground wall insulation. The automatic taping process allows for highest dielectric rating in the ground wall layer.

Subsequently, the coil may be formed at step 130 to ensure proper geometry with the stator core and repeatability of coil nesting. In some embodiments, the coil forming is performed via automated control of forming machines, although the process may be more or less automated. At step 132, the pressing and heating process may occur as previously described. For example, a preheating may result in certain coil 28 sections (e.g., section 32) reaching a desired preheat temperature so that subsequent heating is not substantially dispersed through the conductors 50. A time temperature profile, such as the time temperature profile 90 of pressing and heating may be followed to reach a lubricity window (e.g., window 106). When the lubricity window is reached, a bump cycle may then apply higher pressure to cure the various layers of the coil 28 section.

At step 134 hand taping may be performed, such as for the additional insulation layers as described above (e.g., the end turn and knuckle ground wall layers, the slot corona suppression layer, the voltage grading layer, and the armor tape). Moreover, in this step lead sealing may be performed. At step 136, bake curing may be performed on certain sections of the coil 28. For example, sections other than sections 32 may be oven cured. In some cases, a heat gun may be applied in addition to or alternative to oven curing. For example, a heat gun may "kick off" the curing of the resin in the tapes, which may then slowly cure without baking. Likewise, the baked coil 28 sections may be disposed inside of a metal form so as to better conform to a desired geometry. The baked sections may then be inspected for proper curing and geometry.

With the coil insulated and formed, a final inspection and testing takes place at step 138, which may include resistivity, surge, and power factor/tip up tests. The tests may also include AC hipot tests, and breakdown tests. The coils are then complete and the stator may be wound. Because of the stator size, in some embodiments, the winding may be done in situ. As will be appreciated by those skilled in the art, this winding process typically comprises positioning and pressing the insulated coils into the stator core slots in accordance with the machine design. The process describe herein allows for complete penetration of the tapes in various layers around the coil, provides for the appropriate temperature class rating, as well as for the thermal/dielectric characteristics desired. Moreover, this process provides chemical and abrasion resistance, moisture and contamination resistance, and enhances the life of the coil, particularly during cyclic thermal aging and from partial discharge.

Other features and advantages of the insulation system described above are offered. For example, thinner denser groundwalls transfer heat more efficiently reducing electrical losses (e.g., more compact, permitting uprating of the machine).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for insulating a hydroelectric machine formed coil, comprising:
   wrapping a turn insulation tape over each successive turn of the formed coil;
   wrapping a multi-layer of mica ground wall insulation tape over multiple turns of the coil;
   wrapping a slot corona suppression insulation tape over the ground wall insulation tape of slot cell sections of the coil and extending beyond ends of a core of the machine;
   wrapping a voltage grading insulation over at least a portion of the slot corona suppression insulation and extending beyond the slot corona suppression insulation at ends of the coil;
   wrapping an armor insulation disposed over ends of the coil and at least a portion of coil leads; and
   forming a section of the formed coil by applying a first pressing force and a first temperature based on a time temperature profile, wherein the time temperature profile comprises a lubricity window of time comprising a maximum lubricity where the turn insulation tape fluidly moves approximately equally to the multi-layer mica ground wall insulation tape.

2. The method of claim 1, wherein the forming the section comprises applying a second pressing force during the lubricity window of time.

3. The method of claim 1, comprising preheating the section of the formed coil before applying the first pressing force and the first temperature.

4. The method of claim 1, comprising applying a heat via baking or via a heat gun to cure a second section of the formed coil.

5. The method of claim 1, comprising installing the formed coil into a stator disposed in situ in the hydroelectric machine.

* * * * *